US012686319B2

(12) United States Patent
Lane et al.

(10) Patent No.: US 12,686,319 B2
(45) Date of Patent: Jul. 21, 2026

(54) TARPING ASSEMBLY AND METHODS OF TARPING A LOAD TRANSPORTER

(71) Applicant: SAFE RACK LLC, Andrews, SC (US)

(72) Inventors: Joseph N. Lane, Murrells Inlet, SC (US); Stanley M. Kajdasz, Kingstree, SC (US); Paul Thomas King, Jr., Florence, SC (US); Christopher J. Parke, Huntersville, NC (US); James P. Daniel, III, Moncks Corner, SC (US); Justin S. Johnson, Moncks Corner, SC (US); Zachary J. Long, Greenville, SC (US); Janis Golubeckis, Georgetown, SC (US)

(73) Assignee: SAFE RACK LLC, Andrews, SC (US)

( * ) Notice: Subject to any disclaimer, the term of this patent is extended or adjusted under 35 U.S.C. 154(b) by 82 days.

(21) Appl. No.: 18/985,640

(22) Filed: Dec. 18, 2024

(65) Prior Publication Data

US 2025/0206223 A1      Jun. 26, 2025

Related U.S. Application Data

(60) Provisional application No. 63/612,857, filed on Dec. 20, 2023.

(51) Int. Cl.
B60P 7/08           (2006.01)
B60J 7/10           (2006.01)
B66F 11/00          (2006.01)

(52) U.S. Cl.
CPC ............. B60P 7/0876 (2013.01); B60J 7/102 (2013.01); B66F 11/00 (2013.01)

(58) Field of Classification Search
CPC .. B60P 7/06; B60P 7/0876; B60P 7/00; B60P 7/02; B60P 7/04; B60J 7/10; B60J 7/102;
(Continued)

(56) References Cited

U.S. PATENT DOCUMENTS 364,034 A     5/1887  Nye
4,844,109 A   7/1989  Navarro
(Continued)

*Primary Examiner* — Vivek D Koppikar
*Assistant Examiner* — Wenwei Zhuo
(74) *Attorney, Agent, or Firm* — Nelson Mullins Riley & Scarborough LLP

(57)          ABSTRACT

A tarping assembly for applying a tarp to a load transporter. The assembly comprises a stationary frame structure defining at least one overhead rail extending laterally across a tarping area defining a tarp preparation area portion and a tarp application area portion. The tarp preparation area portion and the tarp application area portion are parallel to one another such that the load transporter may be moved into the tarp application area portion so as to be laterally adjacent to the tarp preparation area portion. A carriage assembly is mounted to the at least one overhead rail for movement between a first lateral position axially aligned with the tarp preparation area portion and a second lateral position axially aligned with the tarp application area portion. A pair of parallel spreader assemblies are connected to the carriage assembly via a linkage arrangement, the linkage arrangement allowing the pair of spreader assemblies to be raised and lowered. A drive arrangement is operative to raise and lower the spreader assemblies and move the carriage assembly between the first and second lateral positions.

12 Claims, 12 Drawing Sheets

(58) Field of Classification Search
CPC ... B60J 7/061; B60J 7/068; B60J 7/085; B60J
7/12; B65D 88/125; B66D 3/18; B66F
11/00
USPC ...... 296/98, 100.01, 100.15, 100.16, 136.04,
296/136.07, 136.1
See application file for complete search history.

(56) References Cited

U.S. PATENT DOCUMENTS

| | | | | |
|---|---|---|---|---|
| 5,186,231 | A | 2/1993 | Lewis | |
| 6,273,401 | B1 | 8/2001 | Payne | |
| 6,502,709 | B1 * | 1/2003 | Parker | B60J 7/102 |
| | | | | 212/328 |
| 6,857,620 | B2 | 2/2005 | Payne | |
| 7,819,262 | B1 * | 10/2010 | Ewan | B60P 7/0876 |
| | | | | 212/326 |
| 8,006,956 | B2 | 8/2011 | Payne | |
| 8,534,592 | B2 | 9/2013 | Payne | |
| 8,919,079 | B2 | 12/2014 | Payne | |
| 11,701,953 | B1 * | 7/2023 | Honeycutt | B60P 7/04 |
| | | | | 296/100.11 |
| 2002/0149225 | A1 * | 10/2002 | Hornady | B60P 7/0876 |
| | | | | 296/100.01 |
| 2009/0256380 | A1 * | 10/2009 | Bennett | B60J 11/00 |
| | | | | 296/98 |
| 2014/0117296 | A1 | 5/2014 | Shrader et al. | |

* cited by examiner

TARPING ASSEMBLY AND METHODS OF TARPING A LOAD TRANSPORTER

CROSS-REFERENCE TO A RELATED APPLICATION

This application is based upon and claims the benefit of U.S. provisional application Ser. No. 63/612,857, filed Dec. 20, 2023, which is incorporated fully herein by reference for all purposes.

FIELD OF THE INVENTION

The present invention relates to an apparatus utilized to apply a tarp to a load transporter, such as a truck trailer or rail car.

BACKGROUND OF THE INVENTION

The use of flatbed trucks for transporting various cargo types, including oversized or irregularly shaped items, necessitates effective and safe covering solutions. The paramount importance of securing cargo lies not only in safeguarding the transported goods from environmental elements but also in ensuring road safety and adherence to legal transport standards. Traditional tarping methods are fraught with challenges, primarily in terms of safety risks and inefficiency. These methods often require intensive manual labor, posing risks of physical injury and being particularly hazardous under adverse weather conditions or when dealing with large, unstable loads.

Many current tarping solutions have significant drawbacks. For example, many systems are not sufficiently adaptable to various cargo dimensions or configurations, necessitating labor-intensive adjustments. Furthermore, these systems frequently fall short in providing a swift and secure tarping process, thereby increasing the risk of accidents and inefficiency in cargo handling operations. Examples of prior art tarp loaders are shown in U.S. Pat. Nos. 8,006,956, 6,857,620, and 6,273,401, each of which is incorporated herein fully by reference in its entirety.

Given these challenges, there is a need for novel tarping systems.

SUMMARY OF THE INVENTION

The present invention recognizes and addresses the foregoing considerations, and others, of prior art construction and methods.

One aspect of the present invention provides a tarping assembly for applying a tarp to a load transporter. The assembly comprises a stationary frame structure defining at least one overhead rail extending laterally across a tarping area defining a tarp preparation area portion and a tarp application area portion. The tarp preparation area portion and the tarp application area portion are parallel to one another such that the load transporter may be moved into the tarp application area portion so as to be laterally adjacent to the tarp preparation area portion. A carriage assembly is mounted to the at least one overhead rail for movement between a first lateral position axially aligned with the tarp preparation area portion and a second lateral position axially aligned with the tarp application area portion. A pair of parallel spreader assemblies are connected to the carriage assembly via a linkage arrangement, the linkage arrangement allowing the pair of spreader assemblies to be raised and lowered. A drive arrangement is operative to raise and lower the spreader assemblies and move the carriage assembly between the first and second lateral positions.

According to some exemplary embodiments, the tarping assembly may further comprise an elongate tarp preparation support structure situated in the tarp preparation area portion. For example, the elongate tarp preparation support structure may comprise an elongated elevated support table. Preferably, the elevated support table may have a width less than a spacing between the pair of spreader assemblies and the drive arrangement may be operative to lower the pair of spreader assemblies to be on respective sides of the elevated support table.

In some exemplary embodiments, each one of the pair of spreader assemblies may define a respective outboard trough that receives a respective side panel of the tarp to be applied to the load transporter. Each of the spreader assemblies may include an elongate spreader bar located inside of and above a bottom portion of an associated one of the outboard troughs. Each of the spreader bars may comprise a sacrificial wear cover.

In some exemplary embodiments, each of the pair of spreader assemblies may include a plurality of clamps operative to releasably maintain the tarp to be applied to the pair of spreader assemblies. For example, the plurality of clamps may be configured to maintain the tarp to be applied on the spreader bar utilizing gravitational force. Alternatively, a spring-loaded device may be provided which allows the tarp to pay out as it makes contact with the load or transporter, in order to apply the tarp taught over the load or transporter.

In some exemplary embodiments, the linkage arrangement may have at least one cross strut to maintain a spacing between the pair of parallel spreader assemblies.

In some exemplary embodiments, the at least one overhead rail may comprise multiple parallel overhead rails.

Another aspect of the present invention provides a method comprising the step of providing a load transporter tarping assembly. The tarping assembly includes a carriage assembly movable from a first lateral position axially aligned with a tarp preparation area portion to a second lateral position axially aligned with a tarp application area portion. A pair of parallel spreader assemblies are connected to the carriage assembly such that the pair of spreader assemblies may be raised and lowered.

According to another step, with the carriage assembly in the first lateral position and the pair of spreader assemblies in a lowered position, a tarp is situated on the pair of spreader assemblies. According to another step, the pair of spreader assemblies are raised carrying the tarp. According to another step, the carriage assembly is moved to the second lateral position. According to another step, the pair of spreader assemblies are lowered on sides of a load transporter located in the tarp application area portion so as to apply the tarp to a top of the load transporter.

Another aspect of the present invention provides a spreader assembly for use in tarping a load transporter. The spreader assembly comprises an elongate spreader bar and a trough structure adjacent to the spreader bar. A plurality of clamps are operative to releasably maintain a tarp on the spreader bar.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
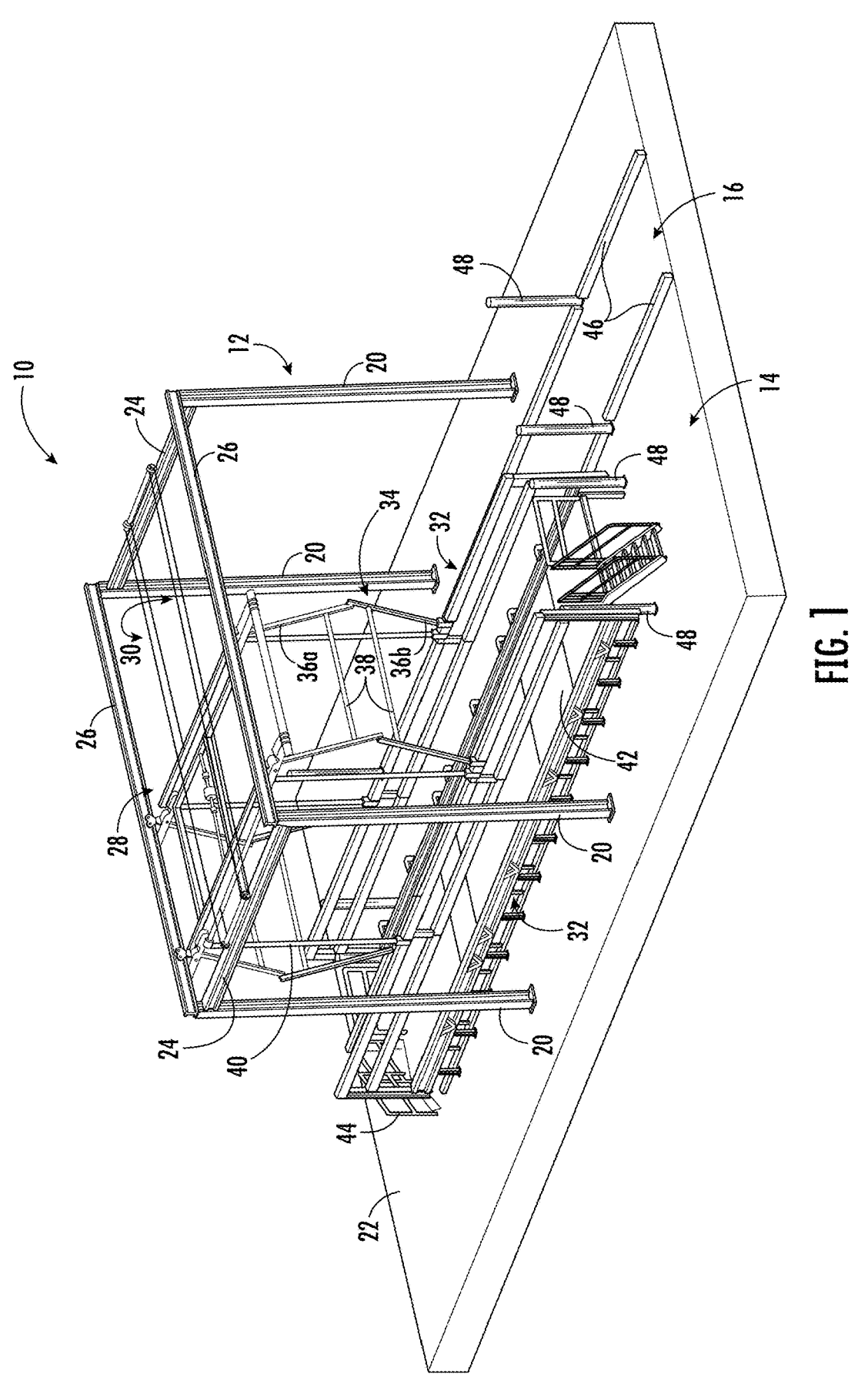
FIG. 1 is a perspective view of a load transporter tarping assembly in accordance with an aspect of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 9:
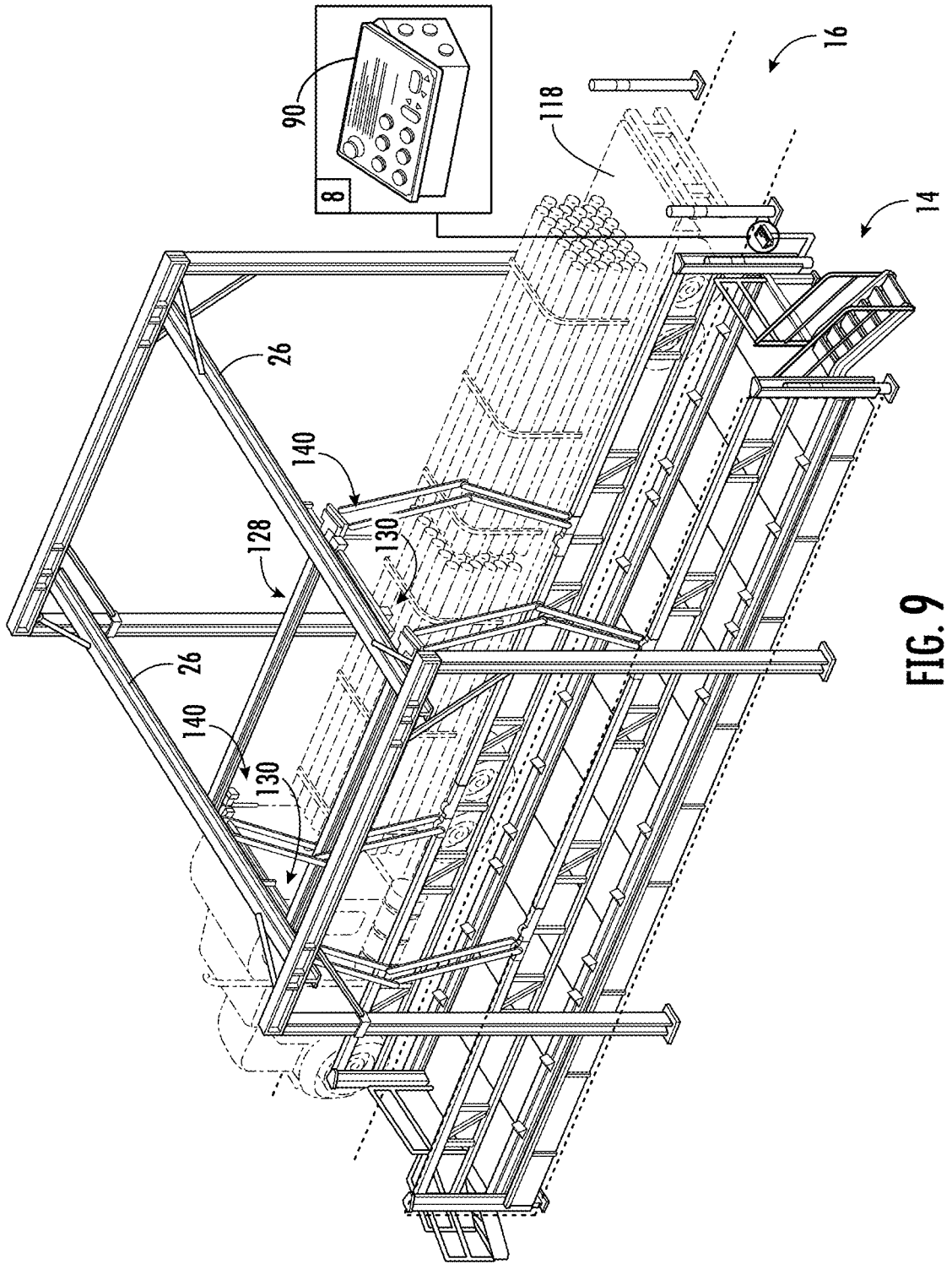
FIG. 9 is a perspective view of a load transporter tarping assembly in accordance with an aspect of the present invention.

FIG. 1 illustrates a tarping assembly 10 constructed in accordance with an aspect of the present invention. Tarping assembly 10 includes a stationary frame structure 12 extending laterally across a work area (i.e., a "tarping area") at which the tarping operation will be performed. The tarping area defines an elongated tarp preparation area portion (generally 14) and an elongated tarp application area portion (generally 16) that are parallel to one another. As can be seen, tarp application area portion 16 defines a lane (or driveway) into which a load transporter 18 (FIGS. 2A-2E) can be moved when a tarp is to be applied. Typically, the load transporter may take the form of a flatbed trailer for a truck, although one skilled in the art will appreciate that aspects of the present invention may be used with other types of load transporters such as open-top containers (e.g., dump trucks, open top trailers, open top railcars). Load transporter 18 takes the form of an open top trailer in FIGS. 2A-2E while a flatbed trailer 118 is illustrated in FIG. 9.

Frame structure 12 has a plurality of uprights 20 located outboard of the area portions 14 and 16, in pairs. The bottom ends of the uprights 20 are appropriately secured to a ground surface 22, such as via bolts embedded in the ground with concrete, etc. A respective strut 24 extends between pairs of uprights 20 in an axial direction parallel to area portions 14 and 16. A pair of overhead rails 26 also extend parallel to one another between pairs of uprights 20 in the cross direction. It will be appreciated that, in some applications, uprights 20 could be eliminated, with struts 24 and/or rails 26 being suspended from the overhead structure of a building.

A carriage assembly 28 moves along the rails 26 back and forth between a first lateral position (shown in FIGS. 1, 2A, and 2B) aligned with the tarp preparation area portion 14 and a second lateral position (shown in FIGS. 2C and 2D) aligned with the tarp application area portion 16. For example, carriage assembly 28 may hang from the rails via roller sets that ride along the rails 26. It will be appreciated that the lateral movement of carriage assembly 28 may be caused by any suitable drive arrangement. In this case, for example, a chain drive arrangement is provided in which a motor turns a pair of driven sprockets to move a pair of chains 30 attached to the carriage assembly 28. The motor and driven sprockets may be supported by a first one of the struts 24 with respective idler sprockets being rotatably supported on a second one of the struts 24. Alternatively, as shown in FIG. 9, crane tractor drives 130 may be provided in which driven wheels engage the bottom surface of the rails 26 causing the carriage assembly 128 to traverse between area portions 14 and 16. In any case, it is desirable to vary the speed of carriage assembly 28 or 128 as it moves between its lateral limits. Specifically, it is desirable for the carriage assembly 28 or 128 to slow down before it comes to a stop in order to reduce swinging of the spreader assemblies 32.

In this regard, tarping assembly 10 further includes a pair of spreader assemblies 32 configured to carry the tarp as it moved onto the transporter 18. Spreader assemblies 32 extend in parallel to one another by a spacing which exceeds the width of the transporter 18. Spreader assemblies 32 are connected to the carriage assembly 28 via a linkage arrangement 34 that allows the pair of spreader assemblies 32 to be raised and lowered as will be described more fully below. In this case, the linkage arrangement 34 has pairs of upper and lower articulating support arms 36a-b that are pivotally connected to each other at their respective distal ends. The opposite, proximal ends of arms 36a-b are pivotally connected to the carriage assembly 28 and an associated one of the spreader assemblies 32, respectively. In this embodiment, two pairs of arms 36a-b are provided, one pair at an aft location of carriage assembly 28 and the other at a forward location of carriage assembly 28, as shown. Cross struts 38 extend between the arms 36a-b in each pair to maintain the desired spacing of the spreader assemblies 32.

Any suitable drive arrangement may be utilized to raise and lower the pair of spreader assemblies 32. In this case a series of flexible tethers 40 in the form of straps or belts are unwound and wound from corresponding spools mounted on the carriage assembly 28. Rotation of the spool in one direction causes the associated tether 40 to feed out, thus lowering the pair of spreader assemblies 32. Rotation of the spool in the opposite directions winds the associated tether 40 onto the spool, causing the pair of spreader assemblies 32 to rise. The spools may be driven by one or more motors, also mounted on the carriage assembly 28. Alternatively, as shown in FIG. 9, chain hoists (such as those indicated at 140) may be connected to the carriage assembly 128 with hooks connected to the top of the spreader assemblies 32.

An elongated tarp support structure is located in the tarp preparation area portion 14 to allow spreading of the tarp and attachment of it to the spreader assemblies 32. In this embodiment, the tarp support structure is configured as an elevated platform (or "table") 42 on which the tarp can be spread. The use of an elevated platform limits contaminates from the ground that might otherwise be picked up by the tarp as it is prepared for application. In the lowered position, the pair of spreader assemblies 32 will be located on the respective sides of the table 42, as shown in FIG. 1. This allows workers standing beside the table 42 to spread the tarp and connect it to the spreader assemblies 32 using clamps (described below). Stairs 44 may be located at one or both ends of the table 42 to facilitate access to the top of the table by a worker as necessary or desired.

Certain additional features of tarping assembly 10 can also be described with reference to FIG. 1. As shown, parallel curbs 46 may be provided in the tarp application area 16 to ensure that the transporter remains in the correct alignment as it is moved into frame structure 12. In addition, appropriate spotting features, such as bollards 48, may be provided to mark the axial ends of the table 42. If the load to be covered is only located at a portion of the transporter, one skilled in the art will appreciate that the transporter will be moved into the correct axial position so that the tarp will cover it when the tarping operation is complete. Also, the pair of spreader assemblies 32 and the table 42 may be made long enough to accommodate multiple tarps at the same time if multiple tarps are required to cover the load completely.

In addition to a spotting function, the bollards 48 also preferably serve as "guideposts" as the pair of spreader assemblies are lowered in both the tarp preparation area portion and the tarp application area portion. Specifically, the spacing of the bollards corresponds to the spacing of the spreader assemblies. As the spreader assemblies are lowered, the bollards ensure that the correct position of the spreader assemblies 32 to the table 42 or the transporter 18 is achieved. As discussed further below, suitable vertical guide tracks may be mounted on each end of the respective spreader assemblies 32 so that they follow the bollards while being lowered.

Figure 2A:
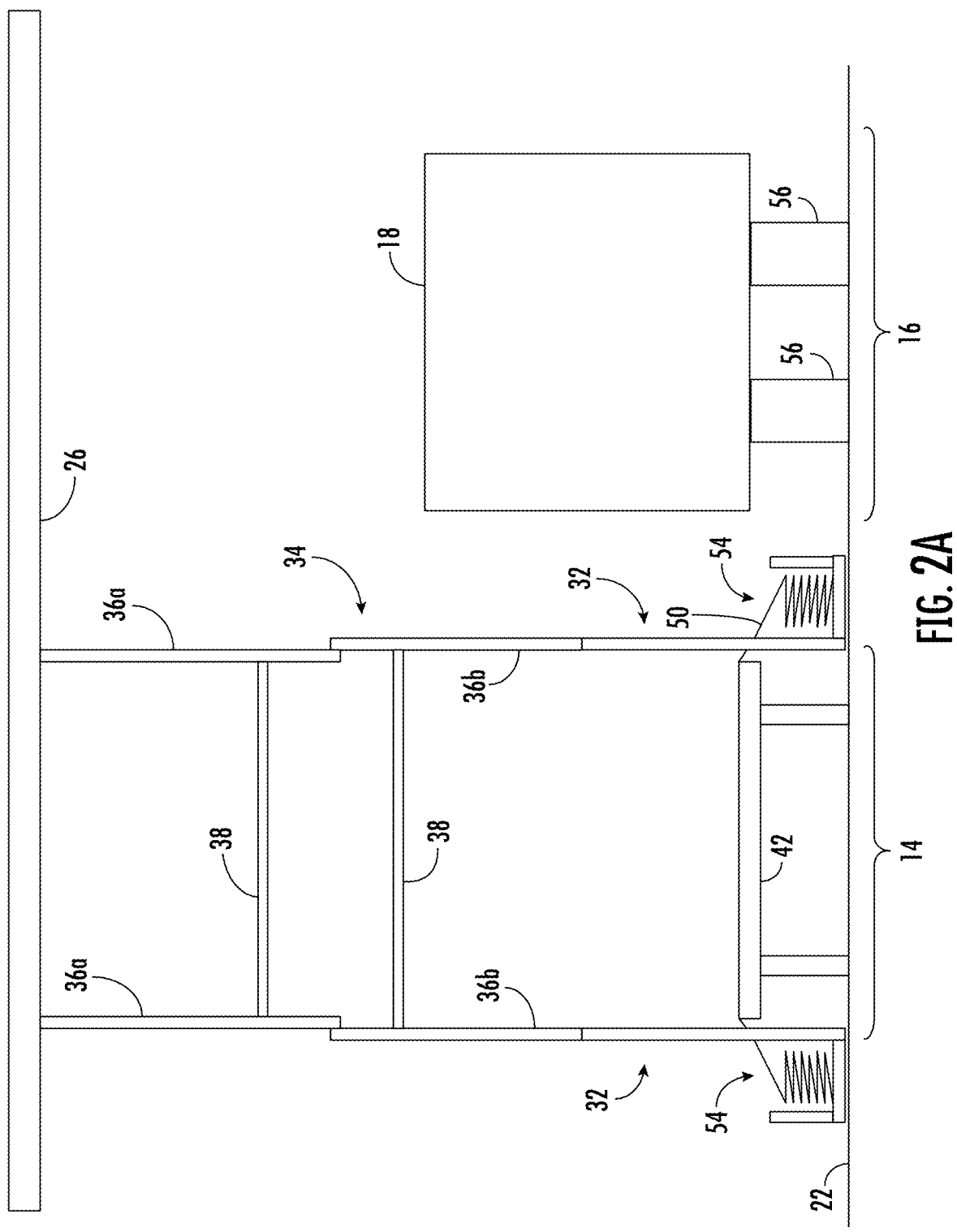
FIGS. 2A-2E are diagrammatic illustrations showing use of a tarping assembly to apply a tarp to the top of a load transporter in accordance with an aspect of the present invention.

Aspects of the operation of tarping assembly 10 will now be explained with reference to FIGS. 2A-2E. Referring first to FIG. 2A, it can be seen that spreader assemblies 32 are in the lowered position on respective lateral sides of table 14. In this position, a tarp 50 may be spread with its middle portion resting on the top of table 42. Side panels of the tarp are draped over respective spreader bars 52 (see FIGS. 3, 4A, and 4B) and clamped. The remaining portions of the side panels of tarp 50 are gathered, as shown, in outboard troughs 54 of the respective spreader assemblies 32. The troughs 54 suitably manage the side panels of the tarp 50 while it is in motion. As a result, the tarp will not drag over the load during movement, thus eliminating risk of damage to either the tarp or the load.

Figure 2B:
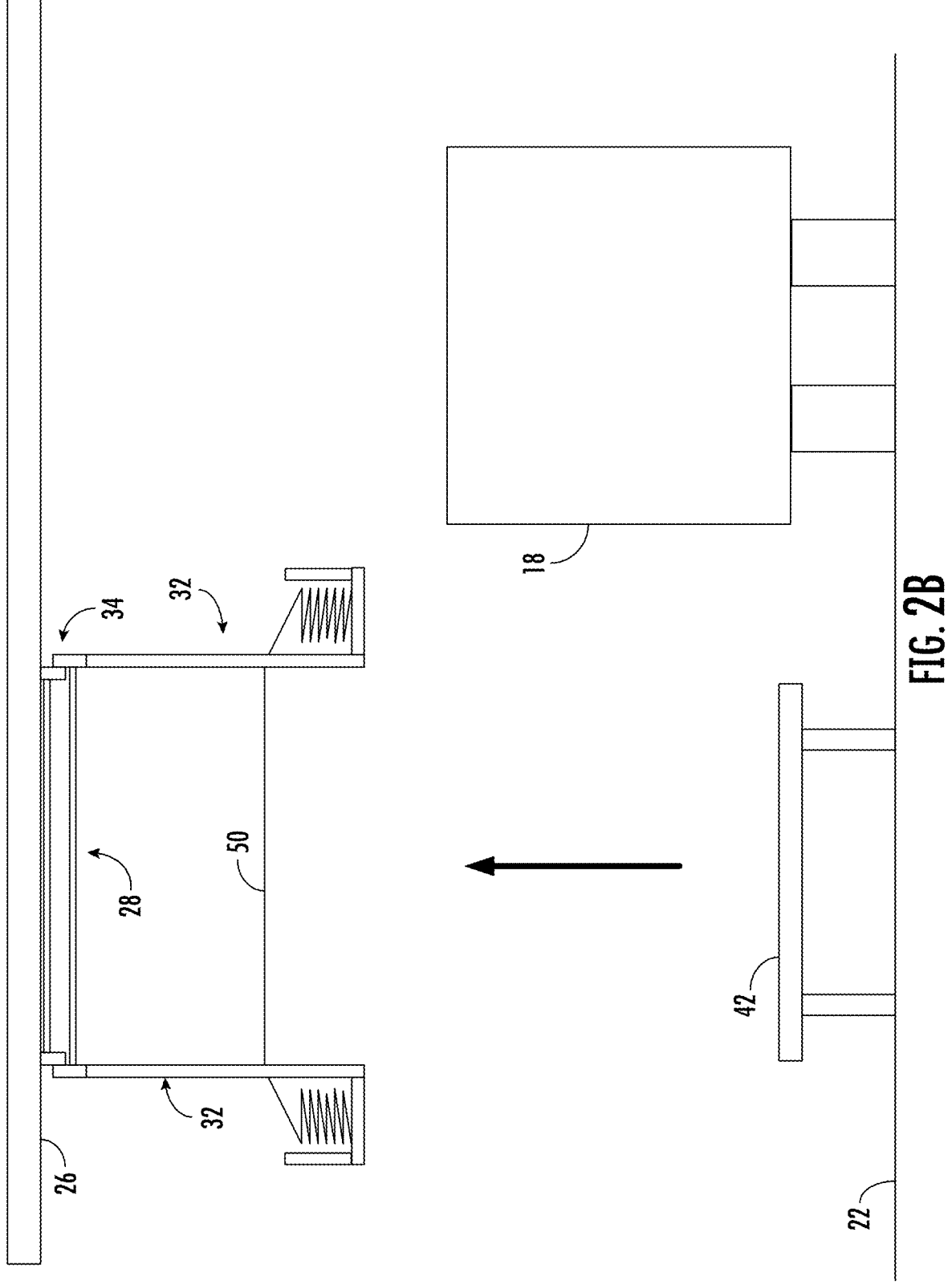
Figure 2C:
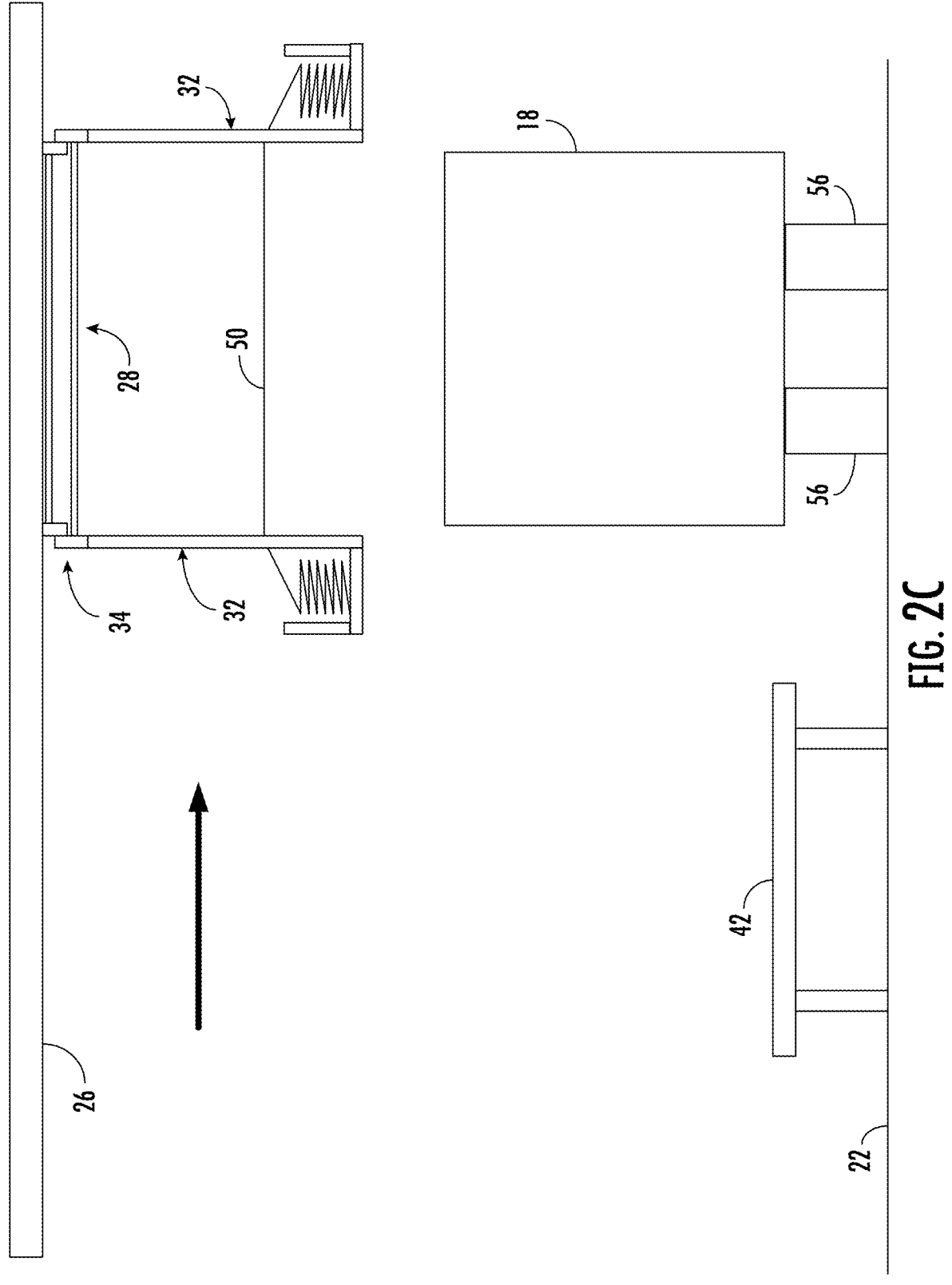
Figure 2D:
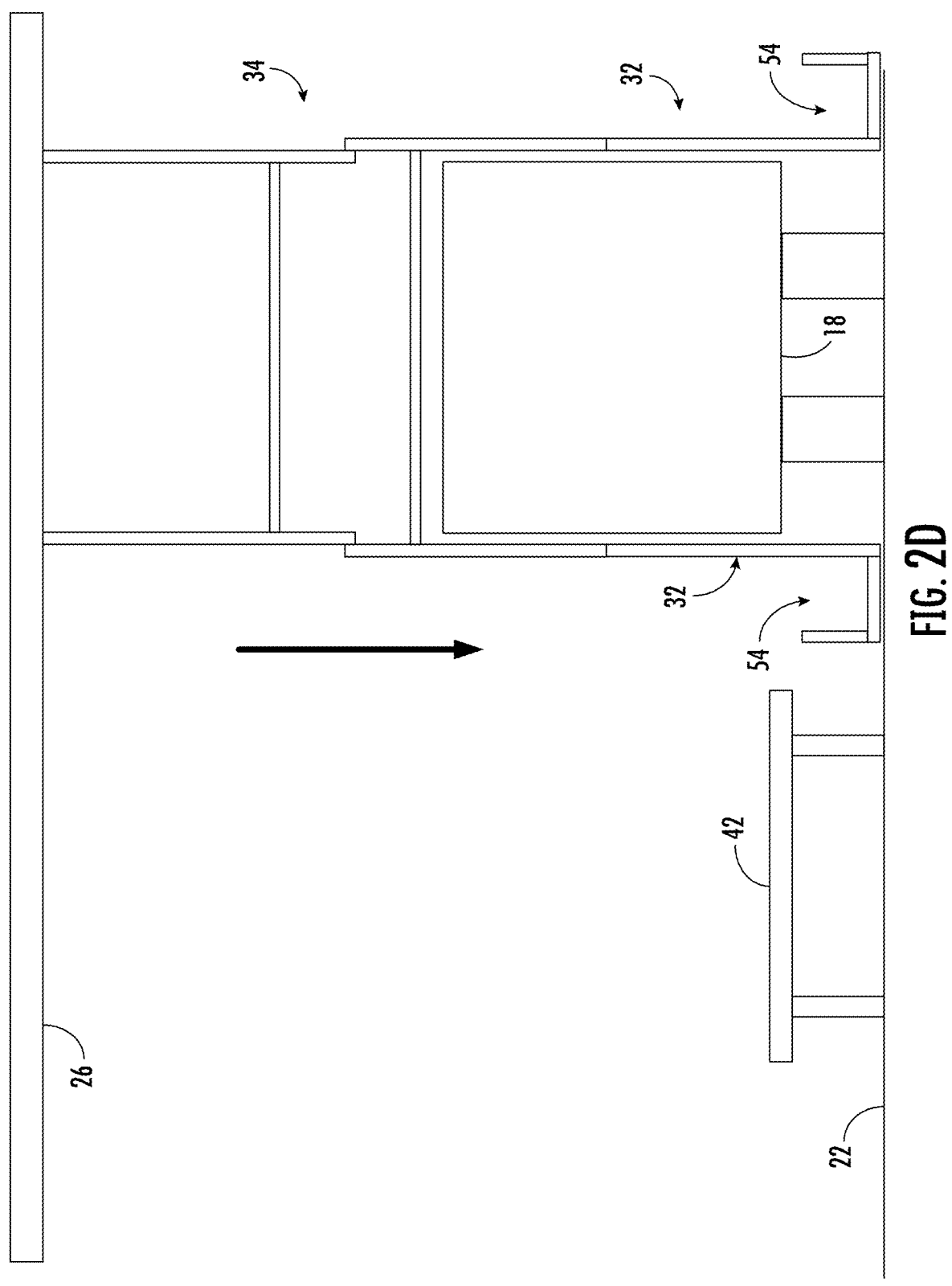

Referring now to FIG. 2B, the spreader assemblies 32, with the tarp 50 suitably attached, may then be raised. Once in a raised position sufficient to clear the top of transporter 18 (including the load on the transporter 18, as applicable), carriage assembly 28 may be shifted from the first lateral position to the second lateral position (as shown in FIG. 2C). (In this case, transporter 18 has wheels 56 by which it can be moved.) When the carriage assembly 28 is in the second lateral position, spreader assemblies 32 may be lowered along the sides of transporter 18 or the load (as shown in FIG. 2D). As the spreader assemblies 32 are lowered, the middle portion of tarp 50 contacts the top of the transporter

Figure 2E:
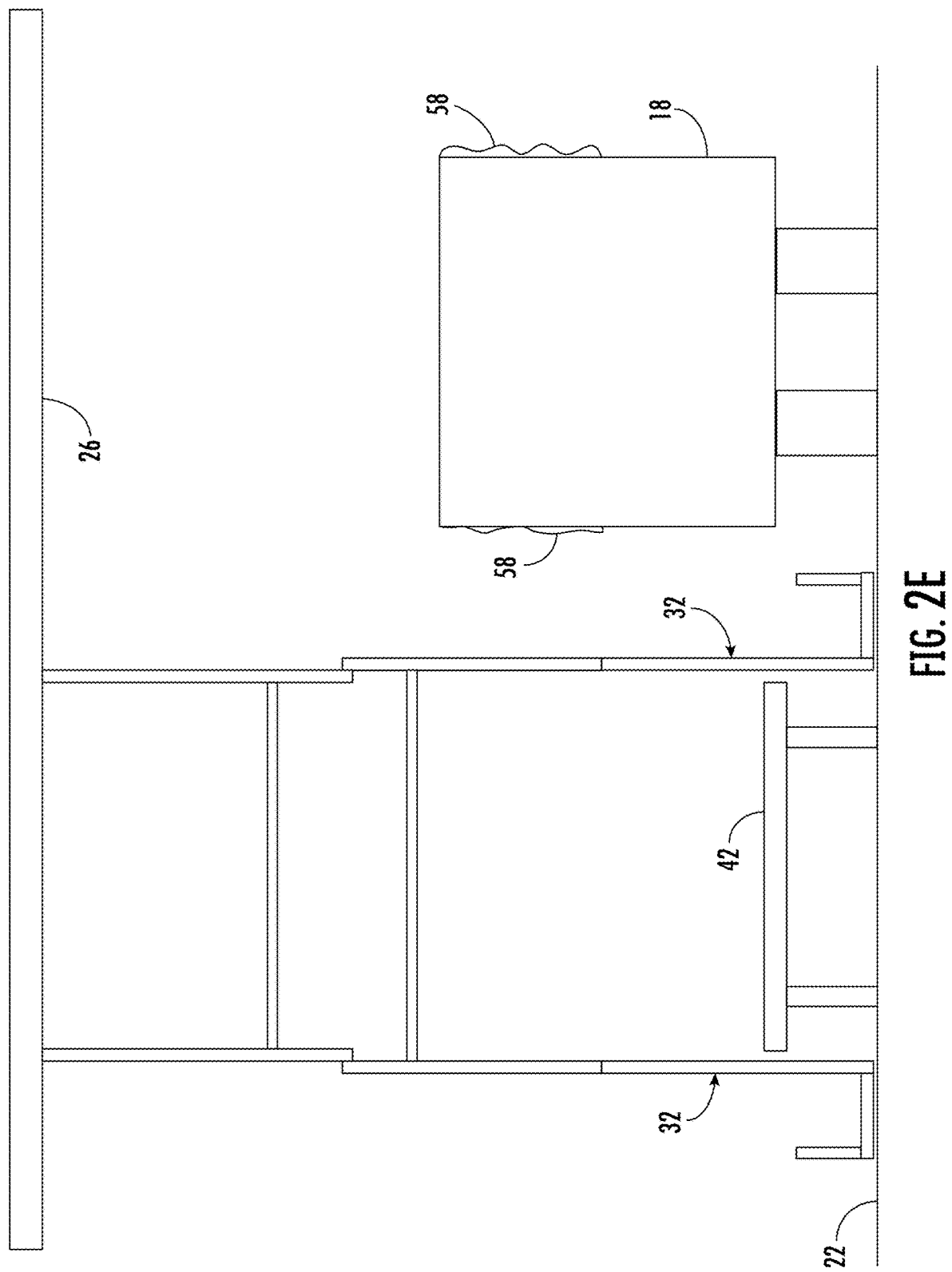

18. Note: The "top" of transporter 18 as used herein also refers to situations where the tarp is primarily draped over the load itself such as in the case of a flatbed trailer. Continued downward movement of spreader assemblies 32 feeds the gathered material in troughs 54 through the clamps until the side panels of tarp 50 are draped along the sides of the transporter 18 (as indicated at 58 in FIG. 2E). Next, as shown in FIG. 2E, the carriage assembly 28 may be returned to the starting position with spreader assemblies 32 beside table 42.

Figure 3:
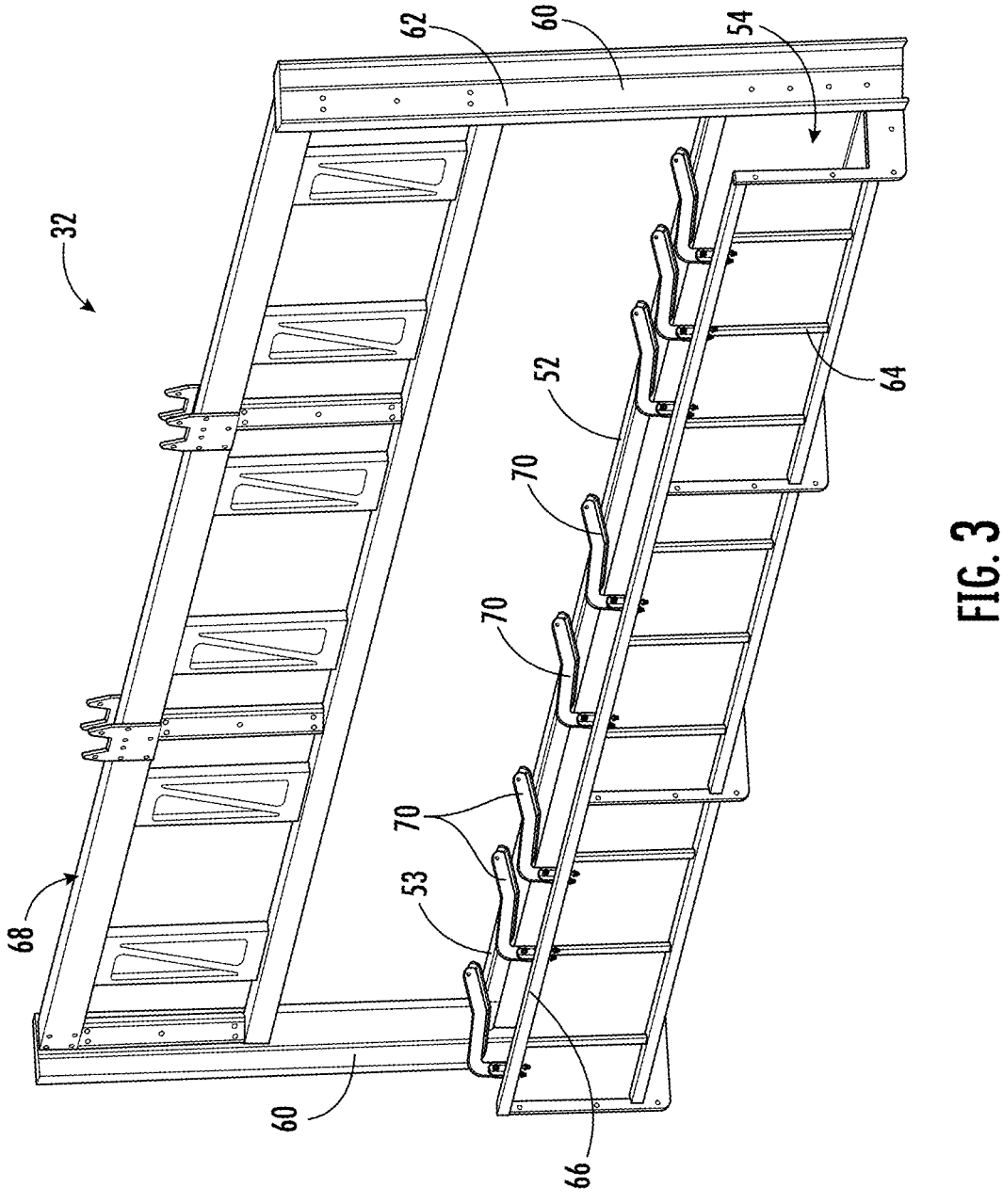
FIG. 3 is a perspective view of a spreader assembly in accordance with an aspect of the present invention.

FIG. 3 illustrates a spreader assembly 32 in accordance with an embodiment of the present invention. It will be appreciated that the axial length of the spreader assembly 32 may depend on the exigencies of a particular application. As shown, a spreader bar 52 extends between a pair of vertical beams 60 respectively located at aft and forward ends of the spreader assembly 32. Spreader bars 52 are located vertically above the bottom portion of the trough 54 so that the tarp can be draped over the spreader bar 52 with the side panels of the tarp gathered in the trough. Spreader bars 52 may have a sacrificial wear cover 53, e.g., made of a suitable polymer such as high-density polyethylene (HDPE), to protect the spreader bar 52 and the tarp. Cover 53 may simply be replaced when worn.

Each of the beams 60 is configured in this embodiment to define an open track 62. As noted above, a bollard 48 is received along the track 62 as the spreader assembly 32 is lowered. In addition, a u-shaped structure 64 defines the outboard trough 54. Structure 64 has a top rail 66 extending parallel to but (in this example) slightly below the level of spreader arm 52. An upper framework 68 also extends between vertical beams 60. Framework 68 adds rigidity to the spreader assembly 32 and allows attachment of the linkage arrangement 34.

FIG. 3 also shows a plurality of clamping devices (such as those indicated at 70) that engage the tarp 50 when it is placed over spreader bar 52. Specifically, the clamping devices 70 are configured to retain the tarp 50 with sufficient force to maintain it on the spreader bars 52 when the spreader assemblies 32 are raised but allow the tarp 50 to be paid out from the clamping devices 70 as the spreader assemblies 32 are lowered beside the transporter 18. In this embodiment, the clamping devices 70 are configured so that the clamping force is provided solely by gravity.

Figure 4:
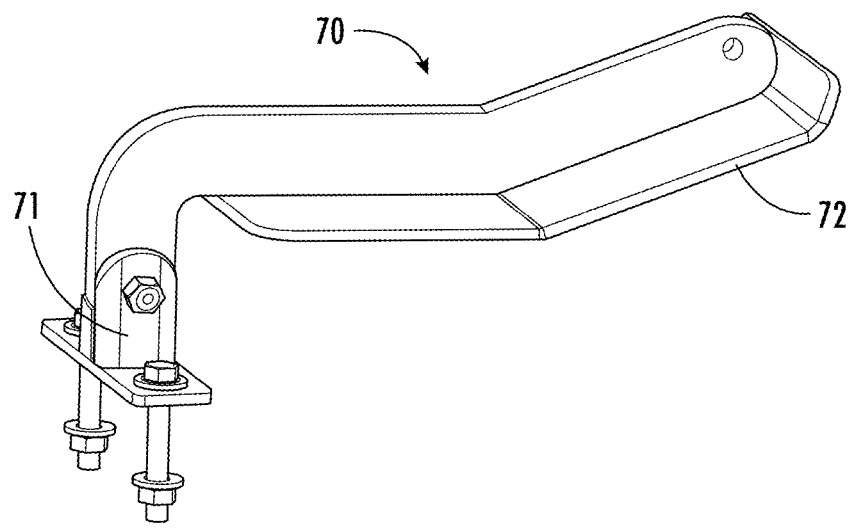
FIG. 4 is a perspective view of a first embodiment of a clamping device in accordance with an embodiment of the present invention.
Figure 5A:
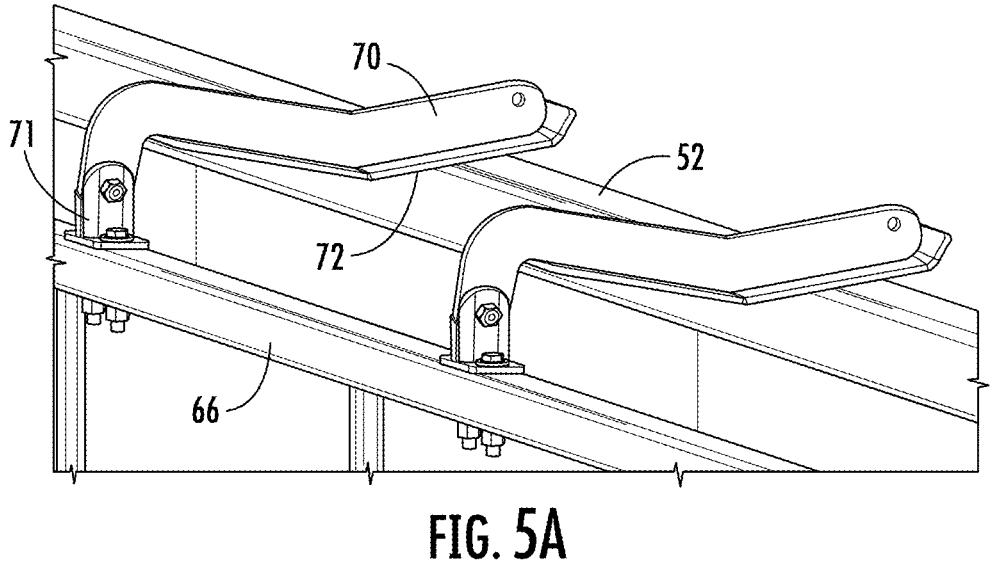
FIGS. 5A and 5B show the clamping device of FIG. 4 in the clamped and unclamped positions, respectively.
Figure 5B:
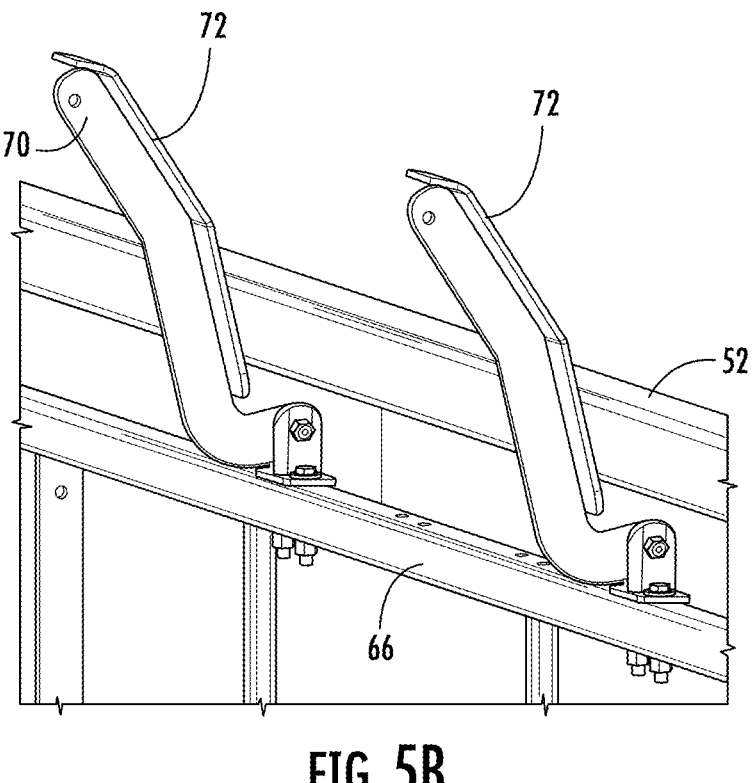

FIGS. 4, 5A, and 5B further illustrate clamping devices 70. As shown, each clamping device 70 has an elongate arm that is pivotally connected at one (proximal) end to a bracket 71 on top rail 66. The other (distal) end of clamping device 70 includes a skid plate 72 that, in the clamped position (FIG. 5A) engages spreader bar 52. If a tarp 50 is located on the spreader bar 52, the tarp will be retained between the upper surface of spreader bar 52 and the skid plate 72. Skid plate 72 provides additional surface area for the engagement but also allows sliding of tarp 50 between the clamping device 70 and the spreader bar 52 as the tarp 50 is applied to the transporter 18. In the unclamped position (FIG. 5B), clamping device 70 is lifted away from spreader bar 52. Because of the slight backward tilt of clamping device 70 in the unclamped position, it will remain unclamped until a user pivots it back to the clamped position.

Figure 6:
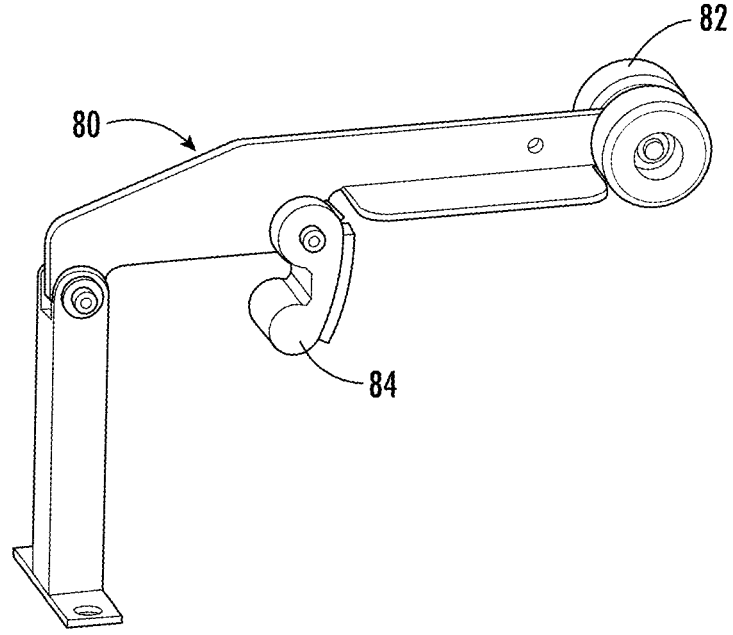
FIG. 6 shows an alternative clamping device that may be used in a tarping assembly in accordance with an aspect of the present invention.

FIG. 6 illustrates an alternative embodiment of a clamping device 80 that may be used in lieu of clamping device 70. As can be seen, clamping device 80 has a roller arrangement 82 at its distal end to facilitate pay out of the tarp 50 as the spreader assembly 32 is lowered beside the transporter 18. A spring-loaded cam lock 84 squeezes the tarp 50 against a side of the spreader bar 52 but releases as pay out begins. As the tarp is being lowered and pulled taut across the load or transporter, the follower roller lifts the clamping arm, releasing the clamping force.

Figure 7:
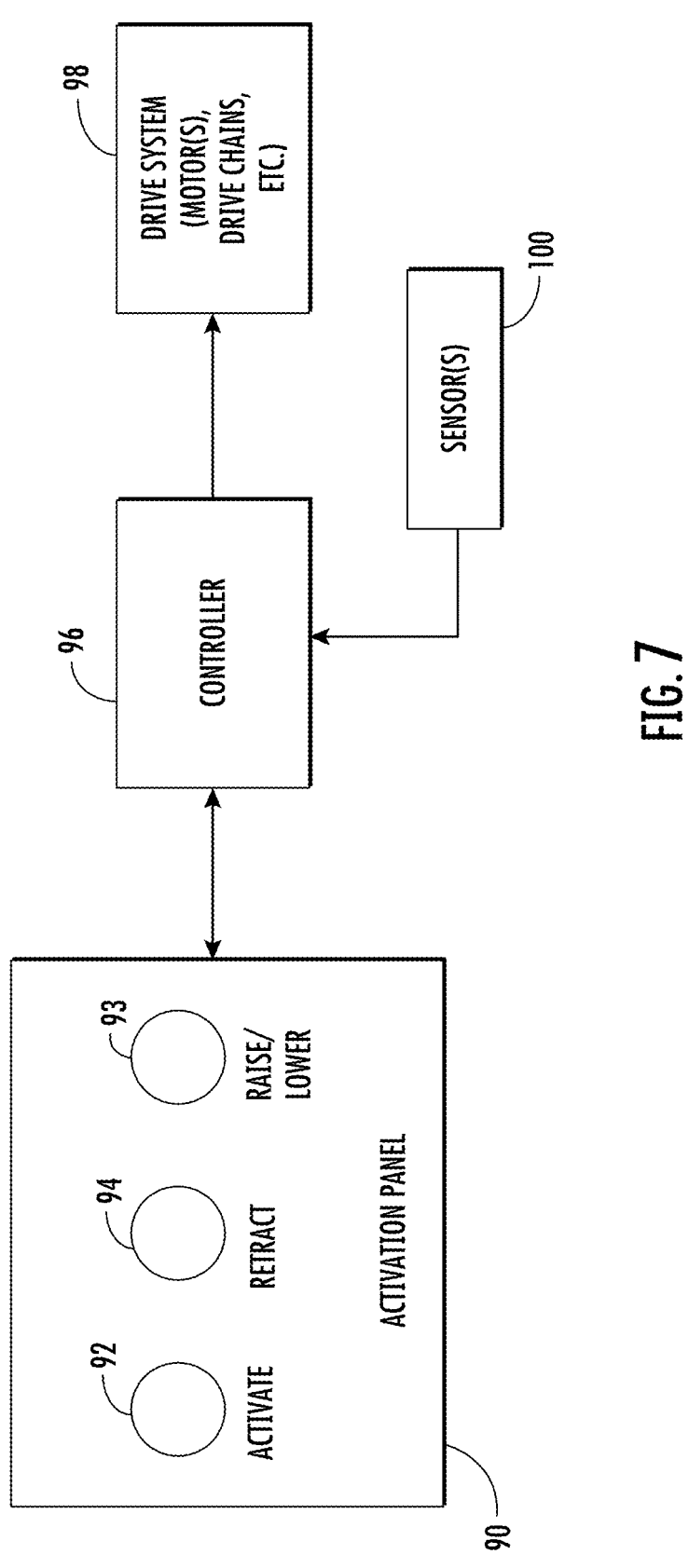
FIG. 7 diagrammatically illustrates certain aspects of the tarping assembly of FIG. 1.

FIG. 7 illustrates exemplary aspects of a control arrangement that may be utilized with embodiments of the present invention. In this regard, an activation panel 90 is preferably located a distance from the spreader assemblies 32 so that a spacing is created between the moving components and the human operators before activation begins. In this case, an activator 92 (e.g., button, switch, etc.) is utilized to initiate the tarping sequence of FIGS. 2A-2D. An activator 93 is then used to lower the tarp onto the load. Another activator 94 is utilized for the return sequence. Activators 92, 93, and 94 are in electrical communication with a suitable control system 96, which itself controls the drive arrangement 98 (described above). One or more sensors 100 may also be provided to indicate any obstruction or unexpected resistance encountered during the tarping or return sequences. In this case, controller 96 may be configured to stop further movement until a reset occurs after the problem has been corrected.

Figures 8A, 8B:
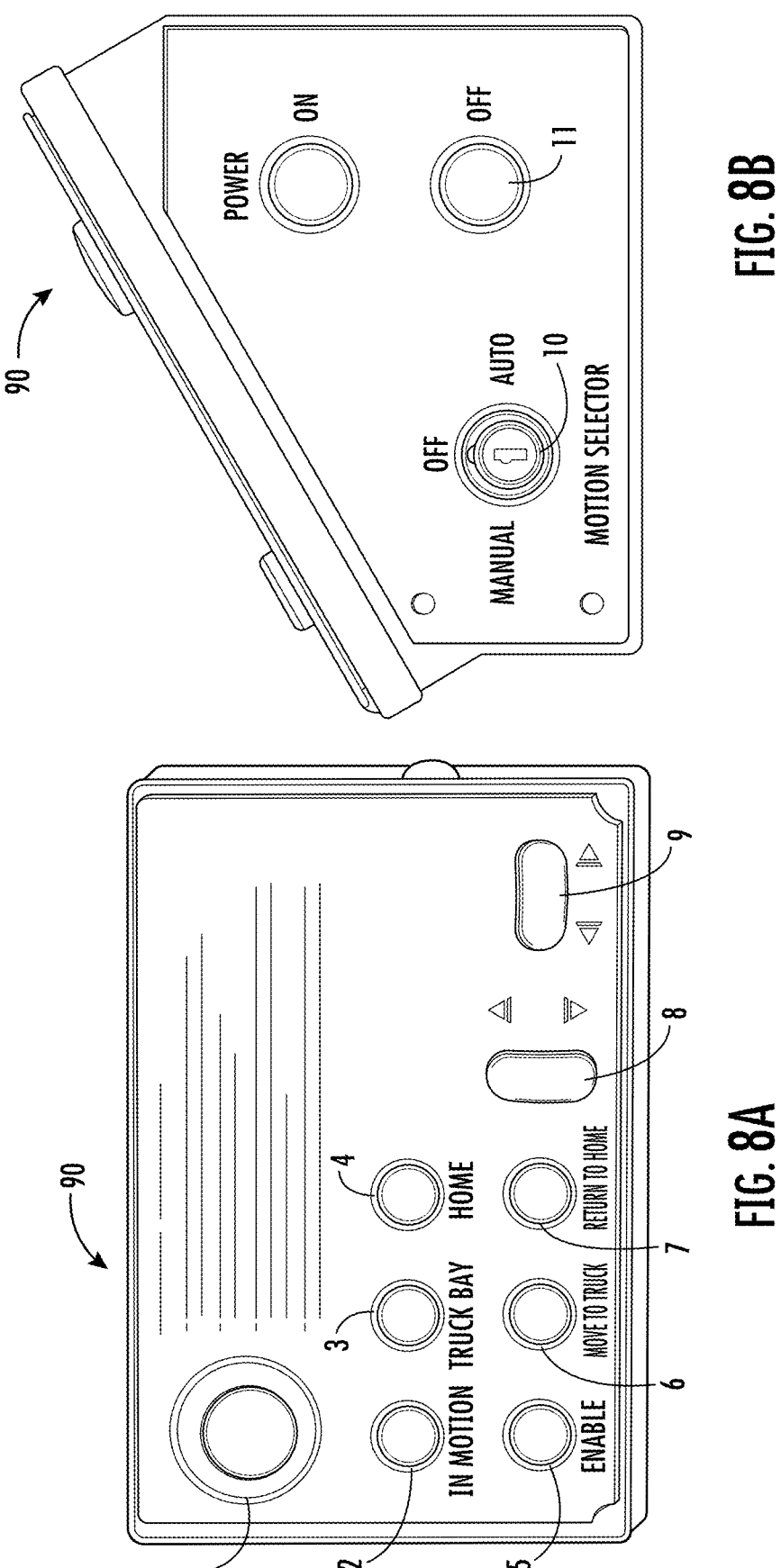
FIGS. 8A and 8B are front and side views of a preferred activation panel in accordance with an aspect of the present invention.

An exemplary embodiment of activation panel 90 is illustrated in FIGS. 8A and 8B, with various items labeled 1-11. The functions of these items are described in the following table.

| 1 | Emergency Stop button: is used to de-energize the control voltage and stop all movement of the tarping system. |
|---|---|
| 2 | In Motion Light: is illuminated (yellow) when the spreader bar assembly is moving to, or from, the vehicle and when the tarp(s) are being lowered onto the load. |
| 3 | Truck Bay light: is illuminated (white) when the spreader bar assembly has reached the truck bay position. |
| 4 | HOME light: is illuminated (white) when the spreader bar assembly has reached the home position |
| 5 | Enable: Used in conjunction with move to truck or the return to home buttons to move the spreader bar assembly to either the truck bay or home positions. |
| 6 | Move to Truck: is used in conjunction with the enable button to move the spreader bar assembly to the truck bay position. |
| 7 | Return to Home: is used in conjunction with the enable button to move the spreader bar assembly to the home position. |
| 8 | Raise/Lower Toggle: is used in conjunction with the enable button to lower the spreader bars down unto the load and trailer. |
| 9 | Left/Right toggle: is used to make minor left or right adjustments to the position of the spreader bar assembly. |
| 10 | Motion Selector Options:<br>MANUAL: allows up/down and left/right movement for maintenance & system setup only.<br>OFF: is used for maintenance and set up. Turns off all control voltage so that the system ON/OFF buttons are inoperable.<br>AUTO: is used normal operation. |
| 11 | Power options:<br>ON used to turn the tarping system on.<br>OFF turns off all control voltage so that the system ON/OFF buttons are inoperable. Always turn the power off before entering the work area. |

Those skilled in the art should appreciate that the above description provides a novel tarping assembly. While preferred embodiments of the invention have been described above, it should be understood that any and all equivalent realizations of the present invention are included within the scope and spirit thereof. The embodiments depicted are presented by way of example only and are not intended as limitations upon the present invention. Moreover, it should be understood by those skilled in the art that the present invention is not limited to these embodiments since modifications can be made. Therefore, it is contemplated that any and all such embodiments are included in the present invention as may fall within the scope and spirit thereof.

What is claimed is:

1. A tarping assembly for applying a tarp to a load transporter, said assembly comprising:

a stationary frame structure defining at least one overhead rail extending laterally across a tarping area defining a tarp preparation area portion and a tarp application area portion;

the tarp preparation area portion and the tarp application area portion being parallel to one another such that the load transporter may be moved into the tarp application area portion so as to be laterally adjacent to the tarp preparation area portion;

a carriage assembly mounted to the at least one overhead rail for movement between a first lateral position axially aligned with the tarp preparation area portion and a second lateral position axially aligned with the tarp application area portion;

a pair of parallel spreader assemblies connected to the carriage assembly via a linkage arrangement, the linkage arrangement allowing the pair of spreader assemblies to be raised and lowered; and a drive arrangement operative to raise and lower the spreader assemblies and move the carriage assembly between the first and second lateral positions.

2. A tarping assembly as set forth in claim 1, further comprising an elongate tarp preparation support structure situated in the tarp preparation area portion.

3. A tarping assembly as set forth in claim 2, wherein the elongate tarp preparation support structure comprises an elongated elevated support table.

4. A tarping assembly as set forth in claim 3, wherein:

the elevated support table has a width less than a spacing between the pair of spreader assemblies; and the drive arrangement is operative to lower the pair of spreader assemblies to be on respective sides of the elevated support table.

5. A tarping assembly as set forth in claim 4, wherein each one of the pair of spreader assemblies defines a respective outboard trough that receives a respective side panel of the tarp to be applied to the load transporter.

6. A tarping assembly as set forth in claim 5, wherein each of the spreader assemblies includes an elongate spreader bar located inside of and above a bottom portion of an associated one of the outboard troughs.

7. A tarping assembly as set forth in claim 6, wherein each of the spreader bars comprises a sacrificial wear cover.

8. A tarping assembly as set forth in claim 6, wherein each of the pair of spreader assemblies includes a plurality of clamps operative to releasably maintain the tarp to be applied to the pair of spreader assemblies.

9. A tarping assembly as set forth in claim 8, wherein the plurality of clamps are configured to maintain the tarp to be applied on the spreader bar utilizing gravitational force.

10. A tarping assembly as set forth in claim 1, wherein the spreader assemblies each have at least one vertical track that receives a guidepost as the spreader assembly is lowered.

11. A tarping assembly as set forth in claim 1, wherein the linkage arrangement has at least one cross strut to maintain a spacing between the pair of parallel spreader assemblies.

12. A tarping assembly as set forth in claim 1, wherein the at least one overhead rail comprises multiple parallel overhead rails.

\* \* \* \* \*